(No Model.) 2 Sheets—Sheet 2.
T. LONG.
DUMPING APPARATUS.
No. 527,119. Patented Oct. 9, 1894.
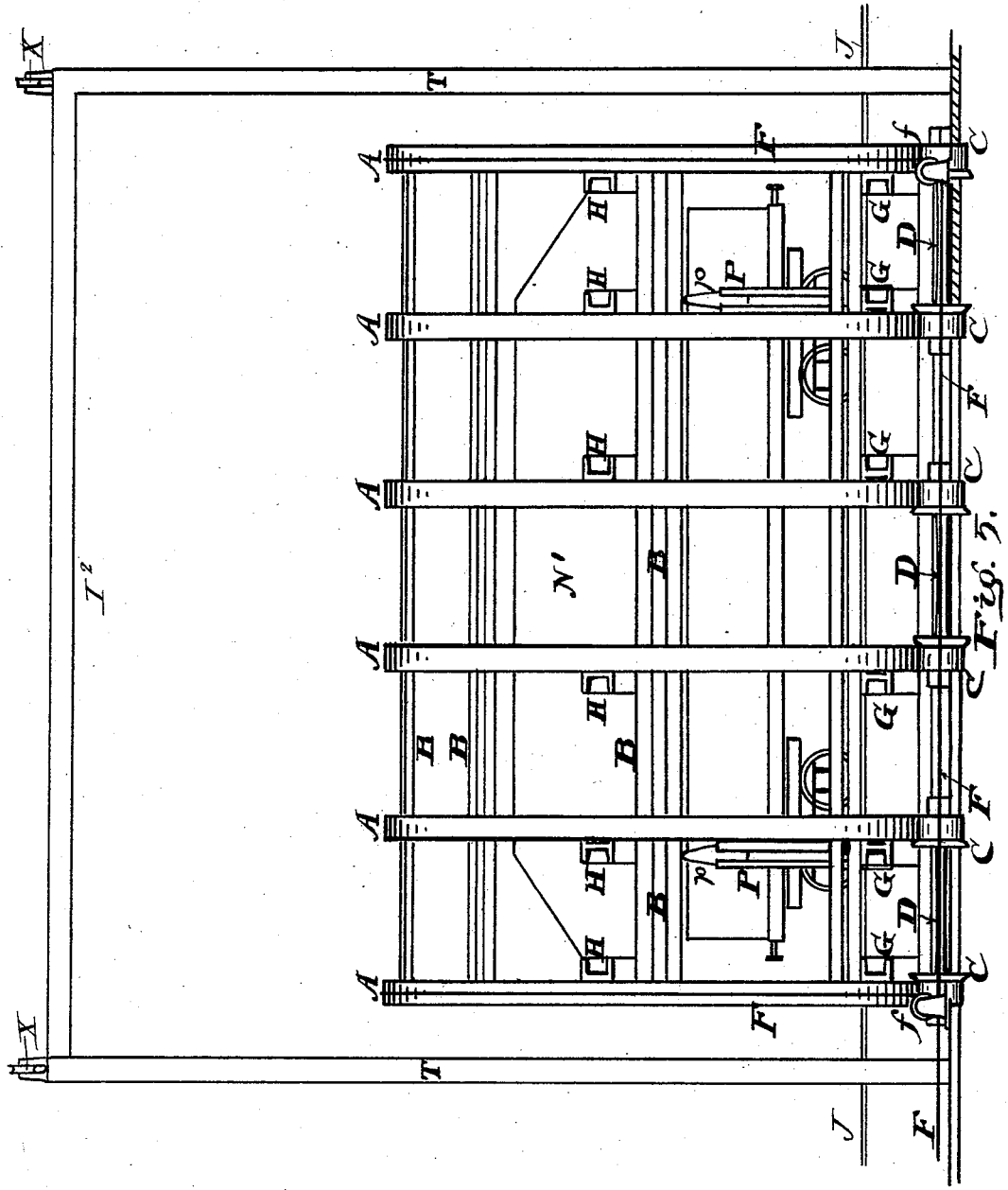
Witnesses,
C. M. Burtner.
T. J. Callow
Inventor,
Timothy Long.
Geo. W. Tibbitts Atty.

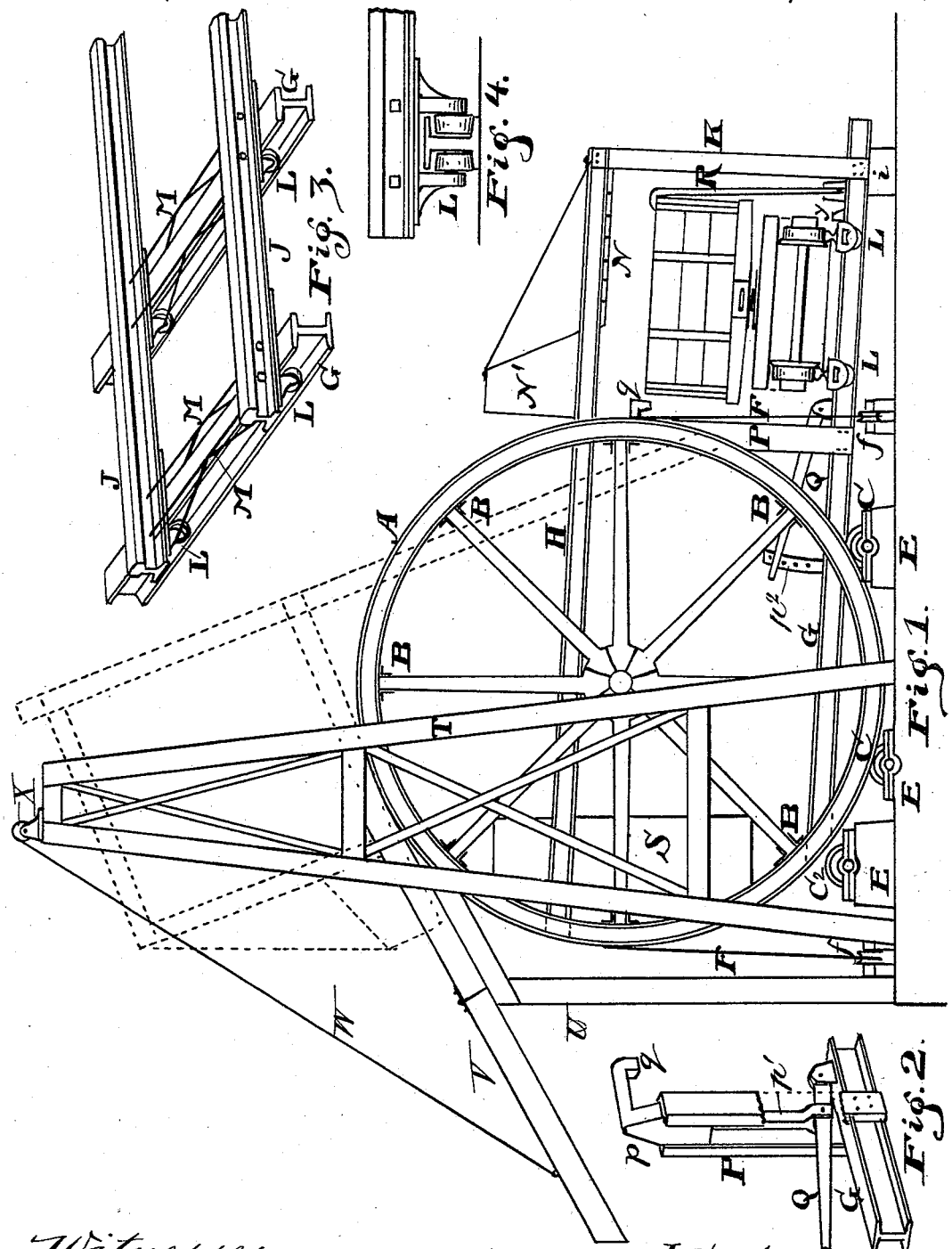

UNITED STATES PATENT OFFICE.

TIMOTHY LONG, OF CLEVELAND, OHIO, ASSIGNOR TO THE LONG MANUFACTURING COMPANY, OF SAME PLACE.

DUMPING APPARATUS.

SPECIFICATION forming part of Letters Patent No. 527,119, dated October 9, 1894.

Application filed January 17, 1894. Serial No. 497,204. (No model.)

*To all whom it may concern:*

Be it known that I, TIMOTHY LONG, a citizen of the United States, residing at Cleveland, county of Cuyahoga, and State of Ohio, have invented certain new and useful Improvements in Dumping Apparatus for Railway-Cars, of which the following is a specification.

This invention relates to an apparatus for receiving and unloading railway cars, and consists of a rolling cylindrical frame, having on one side a platform with tracks to receive the cars, provided with a roof and spout, and means for rolling said cylindrical frame for carrying the loaded car over and discharging its load into a chute at the opposite side of said cylindrical frame.

This invention comprises the new constructions and combinations of mechanisms substantially as hereinafter described, and pointed out in the claims.

In the accompanying drawings:—Figure 1, Sheet 1, is an end elevation of my new apparatus, having a car in place for dumping, the dotted lines showing the position of the car when dumping. Fig. 2 is a detached view of one of the car holding devices. Fig. 3 is a detached view of a portion of the shifting track construction. Fig. 4 is a detached view of one of the track casters. Sheet 2, Fig. 5 is a front elevation of the cylindrical frame which carries the car, showing the arrangement of the wheels upon which said frame rolls.

A, Figs. 1 and 5 represent large rings constructed of angle iron principally. Six of these wheels are shown in Fig. 5 and they are joined by horizontal bars B, which constitute a large cylindrical frame.

C C are car wheels and D D the axles the same as those used in car trucks. They are journaled in the bearings E E, mounted on pillar blocks standing on the timbers of a dock. The rings A are arranged in pairs, and each pair rides on wheels and axles arranged in pairs to support them. The forward pairs of wheels C are located near the center of gravity of the cylindrical frame, and the rear pairs C' are located much farther from the center of gravity, the object of which is to enable the rotating of the frame easier, by reason of the advantage derived from increased leverage over the forward wheels, requiring less power for rotating them. In front of the wheel C is also provided a third set of wheels C² to be in an emergency, such as when the frame is rotated and its load is on top and passes over the center of gravity, the frame might tilt forward, and fall upon these wheels and be supported upon them, and thus avoid any danger of the frame falling forward against the trestle frame and chute. This cylindrical frame is made to rotate bodily on said wheels by means of cables F F attached to the end rings and passing down and running under sheaves *f f* attached to the dock, running from thence to a suitable engine.

G are I-beams secured to the rings A, extending back therefrom a suitable distance to form a support for a car. They are fixed at a slight incline from the level of the dock, and their outer ends rest on blocks or beams *i* on the dock. H are similar I beams attached in like manner to the rings A, also extending back, and have their outer ends supported by posts K rising from the beams G. These beams comprise an annex to the cylindrical frame for carrying the car over with it when the same is rotated. The track rails J J upon which the car stands, are provided with casters L L which run on the lower flanges of the beams G and the said track rails are tied together with cross rods M M, thus constituting a low truck on which the car rests. The object of this will be fully explained farther on.

N is a roof or covering secured by screws or other suitable means to the underside of the beams H, partly covering the car, and N' is a spout next to the rings A, through which load of the car is discharged when the car and its holder are carried up and over into position seen in dotted lines, Fig. 1.

A means for clamping and holding the car down onto its track consists of double posts P made of channel iron, between which are provided moving heads *p* having a hook *q* for catching onto the top edge of the car box. Said head *p* is operated by means of a link *p'* connecting it with a lever Q fulcrumed to the beam G and extending between the two parts of the post. The outer end of the lever is held down by bar or post *p²* having holes for a pin. The other side of the car is held down by hooks and levers R.

S is a counter-balance weight attached to the cylindrical frame on the opposite side to that of the car, and may consist of box to contain rock, ore, or any other material to balance the weight of the loaded car, for the purpose of easing the rotations of the frame, and lessening the amount of power necessary to operate the apparatus.

T T are trestle posts located at the ends of the cylindrical frame, between which the said frame revolves; they are spanned at the top by a cross beam $I^2$. U are posts in front of said trestle posts T which support a hinged chute V, the lower end of which is supported and is drawn up by guy ropes W passing up over pulleys $x$ on the top of the trestle frame.

The operations of this apparatus are as follows:—The loaded car is run on the track rails J, the hooks R and $q$ caught on to the top of the car box; now the power may be applied and the cylindrical frame rotated, which carries the car up and over on its top into the position seen in dotted lines, which brings the spout N' over and lying on the upper end of chute V, discharging the load into said chute.

The object of providing the moving rail truck on which the car stands, is to allow the car to move toward the cylindrical frame for support upon the frame when carried over. When the car is returned to its first position, the rail truck moves away from the frame by reason of the inclined position of the beams G, and rests against stop-blocks $y$. Another object of this, too, is to allow of a free entrance of the car, and avoid its running close to the cylindrical frame and striking against the posts or hooks.

Having described my invention, I claim:—

1. In a dumping apparatus for railway cars, a cylindrical frame composed of rings A, longitudinal bars uniting said rings, wheels C fixed on axles D journaled on pillar blocks E, on the dock and said wheels arranged in pairs, the forward pairs C located nearer the center of gravity than the rear pairs C', and the third emergency pairs of wheels $C^2$; beams G and H attached to said rings A and extending outward, and joined at their ends by posts K roof or cover N and spout N', and a car track, hooks R and P, $q$, for holding the car, and means for rotating the cylindrical frame, in combination substantially as described.

2. In a dumping apparatus the combination with the beams G and the cylindrical frame, of the track truck consisting of the rails J J cross rods M and casters L secured to rails J J and adapted to run on the lower flange of the beams, substantially as described.

TIMOTHY LONG.

Witnesses:
GEO. W. TIBBITTS,
JOHN C. TALCOTT.